(12) United States Patent
Isokoski et al.

(10) Patent No.: US 7,430,232 B2
(45) Date of Patent: Sep. 30, 2008

(54) METHOD AND SYSTEM FOR BROADCASTING A PROGRAMME

(75) Inventors: Arto Isokoski, Oulu (FI); Jorma Kivelä, Oulu (FI)

(73) Assignee: Nokia Corporation, Espoo (FI)

( * ) Notice: Subject to any disclaimer, the term of this patent is extended or adjusted under 35 U.S.C. 154(b) by 175 days.

(21) Appl. No.: 10/536,965

(22) PCT Filed: Nov. 26, 2003

(86) PCT No.: PCT/FI03/00906

§ 371 (c)(1), (2), (4) Date: May 31, 2005

(87) PCT Pub. No.: WO2004/051885

PCT Pub. Date: Jun. 17, 2004

(65) Prior Publication Data

US 2006/0116112 A1    Jun. 1, 2006

(30) Foreign Application Priority Data

Nov. 29, 2002   (FI) .................................. 20022112

(51) Int. Cl.
*H04B 1/00* (2006.01)

(52) U.S. Cl. ...................... 375/136; 375/141; 375/147; 375/150; 375/356; 375/133; 375/135; 375/293

(58) Field of Classification Search ................. 375/150, 375/136, 141, 147, 356, 133, 135, 293; 455/427, 455/466; 725/118
See application file for complete search history.

(56) References Cited

U.S. PATENT DOCUMENTS 5,661,787 A   8/1997   Pocock

| | | | |
|---|---|---|---|
| 2002/0142764 A1* | 10/2002 | Newell et al. | 455/419 |
| 2002/0151271 A1* | 10/2002 | Tatsuji et al. | 455/3.05 |
| 2002/0152091 A1* | 10/2002 | Nagaoka et al. | 705/1 |
| 2002/0154699 A1* | 10/2002 | Yamaguchi et al. | 375/240.25 |
| 2002/0183059 A1* | 12/2002 | Noreen et al. | 455/427 |
| 2003/0078061 A1* | 4/2003 | Kim | 455/466 |
| 2003/0114145 A1* | 6/2003 | Boda et al. | 455/412 |
| 2003/0177504 A1* | 9/2003 | Paulo et al. | 725/118 |

(Continued)

FOREIGN PATENT DOCUMENTS

WO    WO 02/03698    1/2002

(Continued)

*Primary Examiner*—Shuwang Liu
*Assistant Examiner*—Kabir A Timory
(74) *Attorney, Agent, or Firm*—Young & Thompson (57) ABSTRACT

Method and apparatuses for broadcasting and receiving a programme are presented. A programme is broadcast from a broadcasting system. Broadcast programme-associated data is transferred from a server to a cellular radio network. The broadcast programme-associated data is transmitted from a base station of the cellular radio network at a specific frequency defined for the cellular radio network in such a manner that the transmission of the broadcast programme-associated data is synchronized with the broadcasting of the programme. The programme and the broadcast programme-associated data is received with a subscriber terminal of the cellular radio network in such a manner that a programme receiver of the subscriber terminal receives from the broadcasting path of the broadcasting system the programme and a cellular radio network transceiver of the subscriber terminal receives the broadcast programme-associated data at a specific frequency.

48 Claims, 2 Drawing Sheets

U.S. PATENT DOCUMENTS

2004/0137929 A1 * 7/2004 Jones et al. .................. 455/517

FOREIGN PATENT DOCUMENTS

| WO | WO 02/19737 | 3/2002 |
| WO | WO 02/067447 | 8/2002 |
| WO | WO 02/082834 | 10/2002 |
| WO | WO 02/091739 | 11/2002 |

* cited by examiner

METHOD AND SYSTEM FOR BROADCASTING A PROGRAMME

FIELD

The invention relates to a method for broadcasting a programme, a system for broadcasting a programme and a subscriber terminal of a cellular radio network for receiving a programme.

BACKGROUND

Lately, listening to the radio has increased in spite of the fact that the use of other media, such as the television and a computer connected to the Internet, has become more common. A reason for this is the clear broadcasting formats of radio stations that replace record sales, and the increase in the time spent in the car. People listen to the radio with specific radio receivers, such as different portable radios and car radios. Subscriber terminals of a cellular radio network, such as mobile phones, can today have not only a cellular radio network transceiver, but also an ordinary radio receiver with which is possible to listen to radio programs. It is also possible to receive television programs with the subscriber terminals. Broadcast programme-associated data, such as a picture of the performer performing a musical piece in a radio programme, can also be viewed for instance by browsing to the www (world-wide web) site of the broadcasting company, where the picture is displayed. Broadcast programme-specific data can also be transmitted in a digital radio (DAB) on a specific data channel, or as subsidiary transmissions to an FM subcarrier (for instance Radio Data Service RDS and Subsidiary Communications authorization SCA). To increase the ease of use and to provide new services, it would, however, be necessary to improve the interworking of different techniques for implementing the broadcasting of programmes.

BRIEF DESCRIPTION

It is an object of the invention to provide an improved method for broadcasting a programme, an improved system for broadcasting a programme, and an improved subscriber terminal of a cellular radio system for receiving a programme.

As one aspect of the invention, a method for broadcasting a programme is presented, the method comprising: broadcasting from a broadcasting system a programme over a broadcasting path of the broadcasting system; transferring from a server broadcast programme-associated data to a cellular radio network; transmitting from a base station of the cellular radio network the broadcast programme-associated data at a specific frequency defined for the cellular radio network in such a manner that the transmission of the broadcast programme-associated data is synchronized with the broadcasting of the programme; receiving with a subscriber terminal of the cellular radio network the programme and the broadcast programme-associated data in such a manner that a programme receiver of the subscriber terminal receives from the broadcasting path of the broadcasting system the programme and a cellular radio network transceiver of the subscriber terminal receives the broadcast programme-associated data at a specific frequency; and establishing from the subscriber terminal a return channel through the base station to the server. The return channel is used to order a given programme for broadcasting at a specific frequency defined for the cellular radio network and/or the return channel is used to transfer to the server data related to a game to be played in the subscriber terminal.

As one aspect of the invention, a system for broadcasting a programme is presented, the system comprising: a broadcasting system for broadcasting a programme over a broadcasting path of the broadcasting system, a subscriber terminal of a cellular radio network that comprises a programme receiver for receiving a programme from the broadcasting path of the broadcasting system; a server for processing broadcast programme-associated data, which is configured to process synchronization information that defines the synchronization of the transmission of the broadcast programme-associated data with the broadcasting of the programme; and a cellular radio network configured to receive from the server the broadcast programme-associated data and synchronization information and comprising a base station configured to transmit at a specific frequency defined for the cellular radio network the broadcast programme-associated data in such a manner that the transmission of the broadcast programme-associated data is synchronized with the broadcast of the programme according to the synchronization information; and the subscriber terminal of the cellular radio network also comprises a cellular radio network transceiver for receiving the broadcast programme-associated data at a specific frequency defined for the cellular radio network; and the cellular radio network transceiver of the subscriber terminal is configured to establish a return channel through the base station to the server, and the base station is configured to receive the return channel. The subscriber terminal is configured to order by using the return channel a given programme for broadcasting at a specific frequency defined for the cellular radio network, and the server is configured to receive the programme order; and/or the subscriber terminal is configured to transfer to the server by using the return channel data related to a game to be played in the subscriber terminal, and the server is configured to receive the data related to the game from the subscriber terminal.

As one aspect of the invention, a system for broadcasting a programme is presented, the system comprising: a broadcasting system for broadcasting a programme over a broadcasting path of the broadcasting system; a server for processing broadcast programme-associated data, which is configured to process synchronization information that defines the synchronization of the transmission of the broadcast programme-associated data with the broadcasting of the programme; and a cellular radio network configured to receive from the server the broadcast programme-associated data and synchronization information and comprising a base station configured to transmit to the subscriber terminal of the cellular radio network at a specific frequency defined for the cellular radio network the broadcast programme-associated data in such a manner that the transmission of the broadcast programme-associated data is synchronized with the broadcasting of the programme according to the synchronization information; and the base station is configured to receive a return channel from a cellular radio network transceiver of the subscriber terminal. The server is configured to receive from the subscriber terminal a programme order made using the return channel, in which order the subscriber terminal orders a certain programme to be broadcast at a specific frequency defined for the cellular radio network; and/or the server is configured to receive by using the return channel data related to a game to be played in the subscriber terminal.

As one aspect of the invention, a subscriber terminal of a cellular radio network for receiving a programme is presented, the subscriber terminal comprising: a programme receiver for receiving a programme from the broadcasting path of a broadcasting system; a cellular radio network transceiver for receiving broadcast programme-associated data at a specific frequency defined for the cellular radio network; and the cellular radio network transceiver of the subscriber terminal is configured to establish a return channel through a cellular radio network base station to a server. The subscriber terminal is configured to order by using the return channel a given programme for broadcasting at a specific frequency defined for the cellular radio network; and/or the subscriber terminal is configured to transfer by using the return channel to the server data related to a game to be played in the subscriber terminal.

The procedure of the invention provides several advantages. Both a programme and data associated with the programme can be received with one user device. At the same time, it is possible to utilize both free-of-charge and chargeable data transmission capacity for broadcasting the programme and transmitting the associated data as cost-effectively as possible for the listener.

LIST OF FIGURES

The invention will now be described in greater detail by means of preferred embodiments and with reference to the attached drawings, in which.

DESCRIPTION OF EMBODIMENTS

Figure 1:
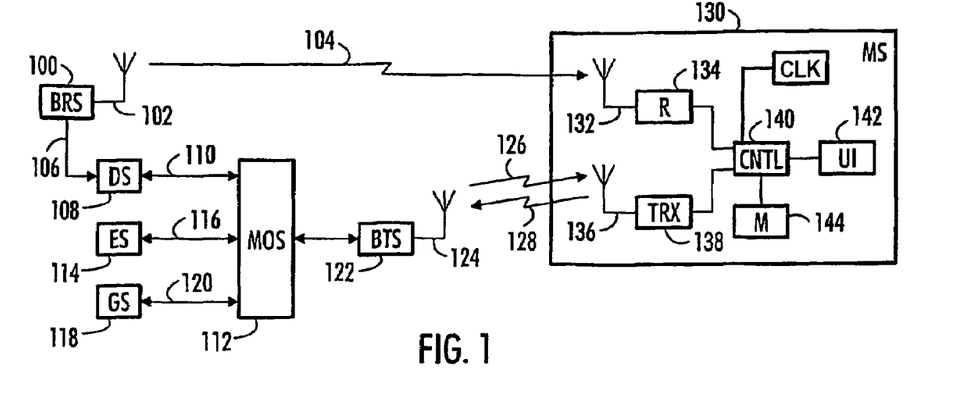
FIG. 1 is a simplified block diagram disclosing a system for broadcasting a programme, FIG. 2 describes in greater detail the system for broadcasting a programme and the internal structure and interconnections of its parts.
Figure 2:
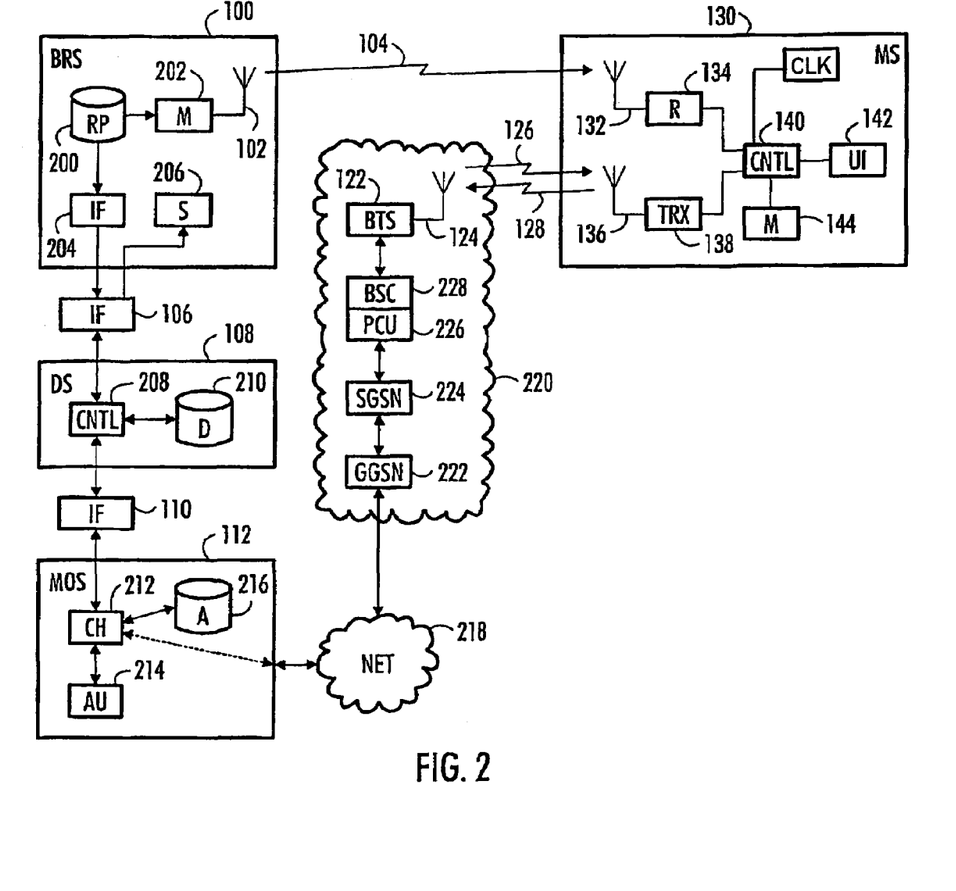

The system for broadcasting a programme is described with reference to FIGS. 1 and 2. In one embodiment, the programme comprises a radio programme. In another embodiment, the programme comprises a television programme. FIG. 1 shows the main parts of the system that are a broadcasting system 100, server 108, 112, base station 122, and cellular radio network subscriber terminal 130. FIG. 2 shows in greater detail the inner structure of the system parts and the interconnections between the parts. In the following, embodiments will be described, in which the programme to be broadcasted is a radio programme, but a person skilled in the art can apply the description to the broadcasting of a television programme in a corresponding manner. In the described embodiments, a radio programme represents the programme, data associated with the radio programme represents the broadcast programme-associated data, a radio broadcasting system represents the broadcasting system, a radio receiver represents the programme receiver, and a frequency defined for the radio broadcasting system represents the broadcast path of the broadcasting system.

By using the radio broadcasting system 100, a radio programme is broadcasted in real-time as radio waves on the air at a frequency 104 defined for the radio broadcasting system 100. The radio can be for instance an FM (Frequency Modulation) radio, AM (Amplitude Modulation) radio, or DAB (Digital Audio Broadcasting) radio. The radio broadcasting system 100 comprises both an audio library 200, in which the radio programmes to be broadcast are stored, and a production and broadcasting machinery 202 of radio programmes having a data transmission connection to the audio library 200. The audio library 200 and the production and broadcasting machinery 202 of audio programmes can be implemented by Jutel® Oy's RadioMan®, which is a system-level information system solution comprising all the necessary components. This solution comprises all the necessary apparatuses for creating, scheduling, organizing, broadcasting, and archiving radio programmes.

Even though in FIG. 2 the audio library 200 is shown as one database, it can naturally consist of several different devices, such as several different database servers and automatic CD (Compact Disc) players, also known as CD jukeboxes. The database servers can be implemented by SQL (Structured Query Language) databases with related database servers, for instance by the IBM® DB2® database software or Oracle® database software. The production and broadcasting machinery 202 is a complex system comprising radio transmitters, antennas 102, automatic music and programme players, editors' workstations for program me design and mixing, an actual audio production studio with its various devices, etc.

The system also comprises a server 108, 112 for processing data associated with a radio programme. The server can be one physical entity, but there may also be several servers; in our example, there are two servers, a data server 108 and a mobile server 112.

The radio programme can contain speech sections, musical pieces and advertisements, for instance. The data associated with the radio programme diversifies the radio programme by adding to the purely audio information also other type of information, such as visual information. The data associated with a radio programme can thus be for instance text, a stationary picture or moving picture. The stationary picture can for instance show the artist performing in the radio programme or the record cover of the broadcast musical piece. The moving picture can for instance be an animation or a video enlivening the musical piece broadcast in the radio programme. The data associated with the radio programme can also be sound. Depending on copyright agreements and the interest of the audience, the data associated with the radio programme can thus contain specific parts of the radio programme, for instance entire musical pieces, parts of musical pieces, speech programmes, parts of speech programmes, news, sports news, jokes, sketches, newsletters, or elements of "talk radio" broadcasts, such as witty remarks of the host of the programme, or a separate report expanding the content of the radio programme. The data associated with the radio programme can also contain links to www pages.

As seen in FIG. 1, the radio broadcasting system 100 has a data transmission connection 106 with a data server 108, and the data server 108 has a data transmission connection 110 to a mobile server 112. The data server 108 comprises a processing unit 208 for executing functions and a database 210 for storing data associated with a radio programme. Radio programmes can also be stored in the database 210. The data transmission connections 106, 110 are implemented in known manners, for instance by using a circuit-switched or packet-switched permanent or temporary connection. The data transmission connections between the radio broadcasting system 100 and servers 108, 112 and internal data transmission connections of the cellular radio network 220 can be implemented using TCP/IP (transmission control protocol/Internet protocol).

The servers 108, 112 are configured to process the synchronization information that defines the synchronization of the transmission of the radio programme-associated data with the broadcasting of the programme. The synchronization information can be generated in the server 108, 112 on the basis of time, for instance, or the synchronization information can be received from the radio broadcasting system 100. The radio broadcasting system 100 can be configured to transfer the radio programme-associated data to the data server 108 which is configured to receive radio programme-associated data from the radio broadcasting system 100. The radio programme-associated data can thus be generated and processed in the radio broadcasting system 100 and transferred from there to the data server 108, or the radio programme-associated data can be generated with a separate apparatus and transferred directly to the data server 108. The radio broadcasting system 100 has a block 204 with which the radio programme-associated data can be defined. The block 204 can thus be used to define the location from which the radio programme-associated data is fetched, or the radio programme-associated data can be generated directly by typing text, for instance.

The mobile server 112 has a connection management block 212 for managing data transmission connections established to subscriber terminals 130 transferring broadcast programme-associated data, an authentication block 214 for checking the access right of the subscriber terminal 130 to a service transmitting radio programme-associated data to the subscriber terminal 130, and an application database 216 from which the subscriber terminal 130 can, when necessary, download applications for processing a radio programme and radio programme-associated data. For billing, the mobile server 112 is configured to maintain a list of subscriber terminals 130 that receive radio programme-associated data. The mobile server 112 can maintain information on the time of use and method of application, and using this information, active users can be rewarded with additional features, for instance. If the user allows that the radio programme-associated data contains advertisements, s/he can be granted plus points; in other words, the user can get the service at a lower cost or s/he can get additional features free of charge.

The structures of the servers 108, 112 are shown as logical entities whose practical implementation may vary. Depending on the scope of the system, the servers 108, 112 can comprise several computers and several database servers. The blocks 208, 210, 212, 214, 216 in the example show the required processing. It is apparent to a person skilled in the art that the structure of the blocks mainly shows logical, functional entities, and there may be more or less of the blocks in question than in the exemplary solution. The number and interworking of the blocks depend on the required processing power and an appropriate degree of integration. In small servers 108, 112, the functions of said blocks can be combined to be performed in one computer, for instance, but in large systems the implementation of even one block may require the use of several computers. The processing power of the used computers also affects the degree of integration. Because the blocks are mainly implemented as software running in the processor, different block can be pieces of software, including the program modules required to perform the functions, and database solutions.

The system also comprises a cellular radio network 220 that is configured to receive from the server 108, 112 radio programme-associated data and synchronization information. The cellular radio network 220 comprises a base station 122 that is configured to transmit to the cellular radio network 220 radio programme-associated data at a specific frequency in such a manner that the transmission of the radio programme-associated data is synchronized with the broadcast of the radio programme in accordance with the synchronization information. The server 108, 112 can also ask from the subscriber terminal 130 the internal time of the subscriber terminal, whereby the server 108, 112 can take a possible time error into consideration in implementing the synchronization. Several back and forth transmissions of the synchronization information can be used to specify statistically the time difference between the subscriber terminal 130 and server 108, 122, thus also improving the accuracy of synchronization.

FIG. 2 shows in more detail the structure of the cellular radio network 220. The cellular radio network 220 should support data transmission to the subscriber terminal 130. In our example, the cellular radio network is GSM (Global System for Mobile Communications) that uses GPRS (General Packet Radio System) for implementing packet-switched data transmission to the subscriber terminal 130. WAP (Wireless Application Protocol) can also be used in data transmission. The embodiments are, however, not limited to this cellular radio network 220 used as an example, but a person skilled in the art can also apply the teachings in other cellular radio networks that support data transmission to the subscriber terminal, such as UMTS (Universal Mobile Telecommunications System).

The cellular radio network 220 comprises the earlier mentioned base station 122 with an antenna 124. The base station 122 comprises at least one transceiver for establishing a bi-directional radio connection 126, 128 to the subscriber terminal 130. A separate base station controller 228 generally does the radio resource management of the base station 122. In GPRS, a packet control unit 226 for processing the protocols required in packet-switched data transmission is arranged to the base station controller 228.

A serving GPRS support node (SGSN) 224 transmits packets to and receives them from the subscriber terminal 130 that supports packet-switched transmission and contains subscriber and location information concerning the subscriber terminal 130. A gateway GPRS support node (GGSN) 222 manages the routing of traffic between the cellular radio network 220 and external networks 218. In our example, the Internet, which connects the cellular radio network 220 and mobile server 112, represents the external networks 218.

The subscriber terminal 130 of the cellular radio network used in the system comprises two different receivers for receiving radio waves: a radio receiver 134 with an antenna 132 for receiving a radio programme at a specific frequency 104 defined for the radio broadcasting system 100, and a cellular radio network transceiver 138 with an antenna 136 for receiving radio programme-associated data at a specific frequency 126 defined for the cellular radio network 220. An example of such a subscriber terminal 130 that contains a radio is the Nokia® 7210. The reception of radio programmes is free, but a requirement for the use of the cellular radio network transceiver 138 is that the subscriber terminal 130 has a subscriber identity module (SIM) obtained from the operator managing the cellular radio network, which contains user-related information and especially information related to information security, such as an encryption algorithm. The cellular radio network transceiver 138 is for instance a prior-art transceiver of a mobile phone, which works in GSM/GPRS or UMTS, for instance. The radio receiver 134 implements an ordinary broadcast receiver, such as FM, AM or DAB receiver. Today, there are many types of subscriber terminals 130, for instance terminals installed in a car and portable terminals, and features better known from personal computers can be implemented in them.

The subscriber terminal 130 also comprises parts implementing a user interface 142: a microphone and loudspeaker to process sound, a display for displaying information, and an input device, which is typically a keyboard, for controlling the device and entering information.

The power source in the subscriber terminal 130 is usually a chargeable battery (not shown in FIG. 1). The subscriber terminal 130 also comprises a processing unit 140 that controls and monitors the operation of the different parts of the device. The processing unit 140 contains application programs, for instance for processing the radio signals of the cellular radio network 220 and for processing the radio signals of the broadcasting system 100. The processing unit 140 can be implemented as a processor with software, but various hardware solutions are also possible, such as a circuit built of separate logic components or one or more application-specific integrated circuits (ASIC). Depending on the required processing power, there may be more than one processor. Various hybrids are also possible, for instance a solution, in which the basic processing is done with a processor and its software, but some tasks requiring high calculation power are done with an application-specific integrated circuit designed for the task.

The configuration of the processing unit 140 creates structural entities that can be implemented with a programming language, such as C, C++, machine language or Assembler as coded program modules. Compiled program modules form a piece of software that is stored as a runtime version in to a memory arranged to the processor and is run by the processor. Instead of compiled programming languages, it is naturally also possible to use interpretive programming languages on the condition that their use meets the required processing rate and power. The applications can be written in the Java™ programming language, and they can be called midlets (cf. Java™ applet).

When implementing the processing unit 140 as ASIC, the required functions are ASIC blocks.

A typical mobile station 130 used in the system comprises the following technologies: a FM radio, GPRS, a Symbian™ user interface, an environment suitable for running pieces of software made with the Java™ programming language, an MPEG (Moving Pictures Expert Group) player for displaying video pictures, a network browser for browsing HTML (Hypertext Markup Language) documents, an AMR (Advanced Multirate) player for reproducing sound, a memory for storing information, and APIs (application Programming Interfaces) for developing applications for said pieces of software.

The subscriber terminal 130 can have a specific user application with which the user can easily manage the reception of the radio programme and the radio programme-associated data. The user application can be installed in the subscriber terminal 130 already at the factory. When the user application is software, it can be downloaded into the subscriber terminal 130 later on, for instance by the vendor or operator of the subscriber terminal 130. The user can also download the user application into his or her subscriber terminal 130, for instance by using the cellular radio network 220 from the application database 216 of the mobile server 112. The user can also download the user application into his or her personal computer through the Internet 218 and then download the user application locally using the infrared technology, for instance, from the computer to the subscriber terminal 130. Parts of the user application can also be downloaded in the described manner into the subscriber terminal 130. Such parts can for instance be functions providing versatility to the user application. The user can personalize the user application with his or her own user profile, for instance by controlling what type of radio programme-associated data s/he wants to receive. Even downloading ready-made user profiles to the subscriber terminal 130 from the mobile server 112 can be possible. The user profile can be stored either into the database 210 of the data server 108 or into the database 216 of the mobile server 112 together with other user information. A unique identifier can be defined for each user profile, with which the user application in each subscriber terminal 130 can be identified. This unique identifier can be given when the user application is downloaded into the subscriber terminal 130.

The system can support several radio stations in such a manner that the data server 108 is connected through a data transmission connection 106 to several broadcast systems 100, and when initiating, the user application provides the user the option of selecting a radio station in one of the ways described in the following. Instead of or in addition to the mobile server 112, the described functions can also be implemented in the data server 108.

The subscriber terminal 130 finds out the identifier of the cell implemented by the base station 122 and transmits it to the mobile server 112. The mobile server 112 has information on various cells and their locations, either received from the cellular radio network 220 operator or learned from the listening profile of the used radio stations or from information provided by users. A list corresponding to the location concerning the covered radio stations can be delivered to the user application on the basis of the location of the subscriber terminal 130.

On the basis of user identification information, the mobile server 112 can ask the location information of the subscriber terminal 130 from the cellular radio network 220, for instance from an LCS (Location Services) server. The mobile server 112 then checks from its database 216 what radio stations are audible in the location of the subscriber terminal 130 defined by the location information. The list of radio stations can also be in a separate location server.

The radio receiver 132 in the subscriber terminal 130 can scan through the frequency spectrum and transmit the scanning results or the frequencies of the audible radio stations to the mobile server 112, which then can on the basis of them define the location of the subscriber terminal 130. The mobile server 112 has location-specific information on different radio stations in its database 216, and it compares this information with the results obtained from the subscriber terminal by means of a separate adaptation algorithm.

Through the user interface 142 of the subscriber terminal 130, the user can input the name of his or her location that is then transmitted to the mobile server 112. The mobile server 112 fetches from its database 216 the radio station list of the location and transmits it to the subscriber terminal 130.

Figure 3:
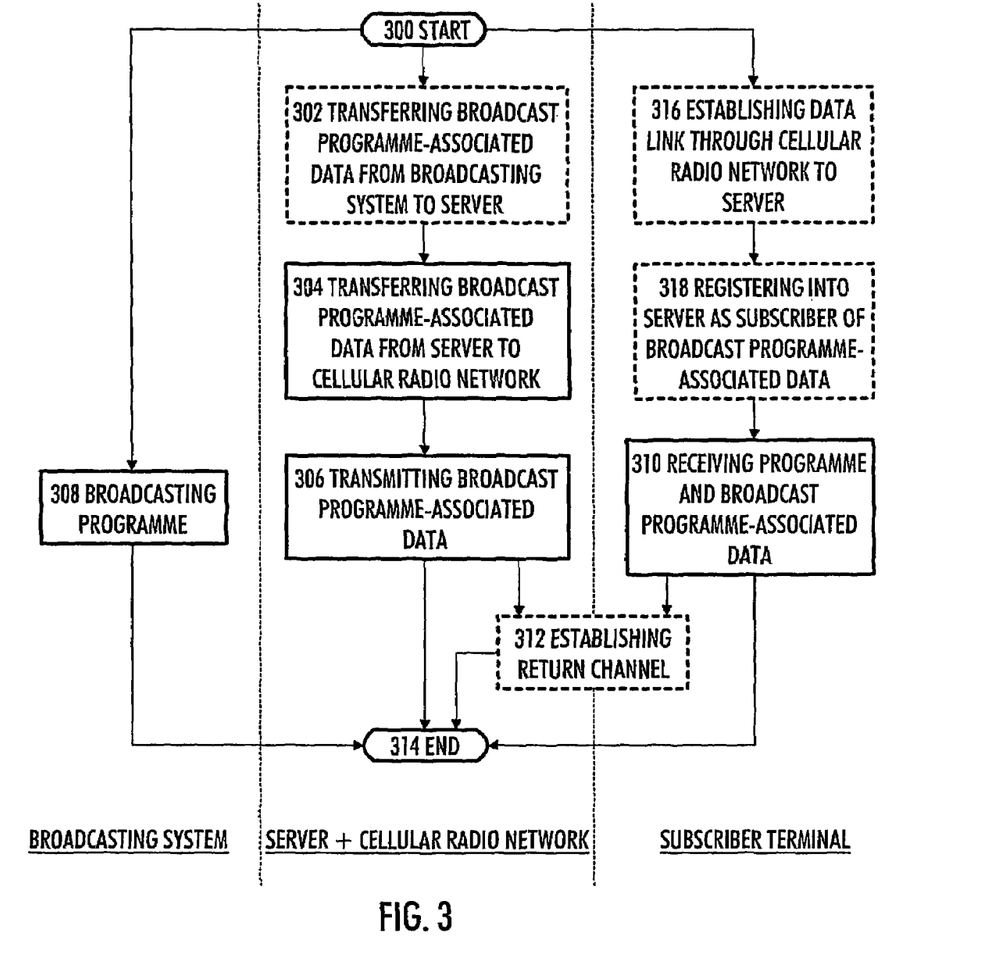
FIG. 3 is a flow chart illustrating a method for broadcasting a programme.

Next, with reference to FIG. 3, a method for broadcasting a programme is described. The method can be implemented by a system of the type described in FIGS. 1 and 2, and the method can be modified as described in the description, but it is apparent that servers of other type and their environments can also be suitable for implementing the method. In one embodiment, the programme comprises a radio programme. In one embodiment, the programme comprises a television programme. The following describes embodiments, in which the broadcast programme is a radio programme, but a person skilled in the art can apply the description to the broadcasting of a television programme in a corresponding manner. In the described embodiments, the equivalents of the concepts are the same as presented above in association with the system, i.e. a radio programme, for instance, represents the programme.

The execution of the method is started in 300. FIG. 3 is divided with two vertical dashed lines into three parts, because to broadcast and receive a radio programme, parallel actions are taken in three different places: in the broadcasting system 100, server 108, 112 and cellular radio network 220, and in the subscriber terminal 130.

In block 308, a radio programme is broadcast from the radio broadcasting system 100 at a specific frequency defined for the radio broadcasting system 100.

In accordance with block 302, radio programme-associated data can be transmitted from the radio broadcasting system 100 to the server 108, 112. In block 304, the radio programme-associated data is transmitted from the server 108, 112 to the cellular radio network 220. Then in block 306, the radio programme-associated data is broadcast from the base station 122 of the cellular radio network 220 at a specific frequency defined for the cellular radio network in such a manner that the broadcasting of the radio programme-associated data is synchronized with the broadcasting of the radio programme. The radio programme-associated data can for instance be text, sound, a stationary picture, moving picture or various combinations thereof. The radio programme-associated data can be processed according to different standards, such as: for text XML (Extensible Markup Language), for sound AMR (Advanced Multirate), for stationary pictures JPEG (Joint Photographic Experts Group), and for moving pictures MPEG (Moving Picture Expert Group).

Synchronization means that the radio programme and the radio programme-associated data are broadcast simultaneously; however, not necessarily in such a manner that both broadcasts take place at exactly the same moment. The structures of the system and the desired accuracy affect the accuracy of synchronization. Naturally, the opinion of the end user is also significant: the usability of the services implemented by the method can be tested by test persons, and one object of the usability testing may be to define suitable synchronization accuracy.

In accordance with block 316, a data link can be established from the subscriber terminal 130 through the cellular radio network 220 to the server 108, 112. Using said data link, the user of the subscriber terminal 130 can register into the server 108, 112 as the subscriber of the radio programme-associated data in block 318.

In block 310, the subscriber terminal 130 of the cellular radio network receives the radio programme and radio programme-associated data in such a manner that the radio receiver of the subscriber terminal receives the radio programme at a specific frequency defined for the radio broadcasting system and the cellular radio network transceiver of the subscriber terminal receives the radio programme-associated data at a specific frequency defined for the cellular radio network.

The execution of the method is continued as long as there is something to broadcast, in an extreme case around the clock from one day to another. The use of the method can also be periodic, for instance in such a manner that at night a radio station broadcasts non-stop music, but not any radio programme-associated data, and at other times both a radio programme and associated data. The execution of the method is stopped in block 314. For an individual subscriber terminal 130, the execution of the method is stopped when the subscriber terminal 130 is switched off, or when the subscriber terminal informs the mobile server 112 that it does no longer want to receive the radio programme-associated data.

In one embodiment, the radio programme-associated data comprises information defining the broadcast time of the radio programme. The user interface 142 of the subscriber terminal 130 can then be configured to start presenting the radio programme on the basis of the information defining the broadcast time. For instance, if the radio programme-associated data contains information that a certain radio programme starts at 12 o'clock, and the user has defined in the processing unit 140 of the subscriber terminal 130 by using the keyboard of the user interface 142 that he wants the radio receiver 134 to start receiving said radio programme and to present it through the loudspeaker of the user interface 142, then this takes place automatically after the cellular radio network transceiver 138 receives the information defining the broadcasting time and processes it with the processing unit 140. It is then also possible to start presenting any radio programme-associated data automatically on the display of the user interface 142 at 12 o'clock.

In one embodiment, the subscriber terminal 130 comprises a memory 144, and the subscriber terminal 130 is configured to store the radio programme into the memory 144 on the basis of the information defining the broadcast time. The configuration is directed to the processing unit 140 of the subscriber terminal 130. The memory 144 can be implemented in known manners of implementing a non-volatile memory for instance as a memory circuit or a small hard disk. With this method, the user can define that s/he is interested in certain radio programmes, such as news broadcasts, that are stored into the memory 144 of the subscriber terminal 130, from which the user can then listen to them later through the loudspeaker of the user interface 142 in the subscriber terminal 130. An advantage of the method is that the user does not need to listen to the news in real time, but can listen to them when s/he has time. Naturally, the radio programme-associated data can also be stored into the memory 144, wherefrom the user can then later bring them to his or her awareness through sensory perception for instance by viewing the radio programme-associated data on the display of the user interface 142 while listening to the radio programme through the loudspeaker of the user interface 142. The radio programme-associated data can contain information on the start and end points of the recorded audio, such as the envelope and/or pause profile of the audio, whereby the recording can be timed exactly. The timing can be done in real time or as post-processing. When using post-processing, the recording is made extra long, whereby the information on the start and end points is used to automatically clean up the start and end of the recording.

In one embodiment, in accordance with block 312, a return channel 128 is established from the subscriber terminal 130 through the base station 122 to the server 108, 112. The cellular radio network transceiver 138 of the subscriber terminal 130 is configured to establish the return channel 128 through the base station 122 to the server 108, 122, and the base station 122 is configured to receive the return channel 128. The information in the return channel can be processed in the mobile server 112, data server 108, or radio broadcasting system 100, depending on the application.

In one embodiment, the subscriber terminal 130 is configured to order by using the return channel 128 a certain radio programme for broadcasting in real time or non-real time at a specific frequency defined for the cellular radio network 220. This order can be processed in the mobile server 112, and the mobile server 112 orders the desired radio programme from the data server 108, the database 210 of which has obtained it from the radio broadcasting system 100 and stored it. In certain cases, it may be possible that the radio programme is fetched directly from the radio broadcasting system 100 to the mobile server 112. The method makes it possible to implement an "on-demand" service for radio programmes, i.e. the user can order the radio programme s/he wants, for instance a weather forecast or stock exchange news, to be broadcasted through the cellular radio network 220 to his or her subscriber terminal 130. Naturally, any possible radio programme-associated data can also be transmitted to the subscriber terminal 130 at the same specific frequency 126 defined for the cellular radio network 220. The user of the subscriber terminal 130 can then allow the subscriber terminal 130 to present on the user interface 142 the ordered radio programme with the possible radio programme-associated data immediately, but s/he can also store it with the data into the memory 144 of the subscriber terminal 130 for presenting later on.

In one embodiment, the subscriber terminal 130 is configured to transmit by using the return channel 128 feedback information associated with the radio programme to the radio broadcasting system 100, and the radio broadcasting system 100 is configured to receive the feedback information associated with the radio programme from the subscriber terminal 130. Because the mobile server 112 maintains a list of the subscriber terminals 130 that receive the radio programme-associated data, this list can be transmitted together with the feedback information to the radio broadcasting system 100, which has a specific session block 206 with which the producer of the currently broadcast radio programme, i.e. an "on air" radio programme, can implement polls, competitions and other events of this type, in which the feedback of the recipient of the radio programme can be utilized. The producer of the radio programme thus sees for instance that approximately 100,000 listeners are receiving the radio programme-associated data, and s/he can perform a quick gallup poll on a highly topical issue in the form of one question, for example, and then sees in real time through the user interface of the session block 206 nearly in real time how the results of the gallup poll develop and what is the final result. With this method, it is possible to replace awkward telephone gallup polls that may block the phone connections. The amount of data traffic required in the cellular radio network 220 for instance when replying to one question in text format is only a fraction of the data transmission capacity required by an ordinary call.

In one embodiment, the subscriber terminal 130 is configured to make a purchase by using the return channel 128, which purchase relates to an advertisement presented in the radio programme and/or radio programme-associated data. The server 108, 112 is then configured to receive purchase information from the subscriber terminal 130. Because the processing of confidential information is usually associated with purchasing, this functionality can, as shown in FIG. 1, be transferred from the data server 108 to a specific purchasing server 114 designed for electronic commerce, which is then connected over a secure and/or encrypted data transmission connection to the mobile server 112.

In one embodiment, the subscriber terminal 130 is configured to transfer by using the return channel 128 to the server 108, 112 data related to a game to be played in the subscriber terminal 130. The server 108, 112 is then configured to receive the data related to the game from the subscriber terminal 130. Because the processing of game data can require high calculation power, especially when numerous players play the same game simultaneously, the functionality can, as shown in FIG. 1, be transferred from the data server 108 to a specific game server 118, which is connected through a data transmission connection 120 to the mobile server 112.

The subscriber terminal 130 can be configured to receive in advance data required by a game, competition or another interactive action, such as a query, user application or parts of a game. This data received in advance is, however, not used in the subscriber terminal 130 before the server 108, 112 permits it, for instance when a radio programme or game is at a certain stage. This way, it is possible to avoid a momentary overload in the capacity of the cellular radio network 220 by not transmitting the radio programme-associated data to all subscriber terminals 130 at the same time, and staggering it to a period prior to a certain stage. Giving the permission can be timed in relation to the clock in the subscriber terminal 130.

The use of the radio broadcasting system 100, the different servers 108, 112, 114, 118, and the cellular radio network 220 for broadcasting a radio programme and associated data is done technically in the described manner. In a business model, the revenue from the service is distributed to the mobile operator through data transmission billing and to the providers of the service content and service concept. The service concept provider can be a broadcasting company as a whole or in part. At minimum, the share of the broadcasting company is to provide, for a fee, the radio programme-associated data and possibly also a connection to the audio library 200. The share of the broadcasting company can also contain the management of the servers 108, 112, 114, 118 producing services and billing for the services by the operator, but the operator or an external service provider can also take up this role. The service is, however, clearly profiled to the broadcasting company and its listeners. Therefore, the share of the broadcasting company in publicizing and advertising the service is important. Technically, it is also possible to attach advertisement material advertising the service to the radio programme-associated data transmitted to the user. The use of the service can be billed in the phone bill of the user of the subscriber terminal 130 receiving the radio programme-associated data.

In one embodiment, the server 108, 112 is configured to multiplex the radio programme and the radio programme-associated data for broadcasting in a digital radio on a specific data channel or as subsidiary transmissions to an FM subcarrier.

Even though the invention has been explained in the above with reference to an example in accordance with the accompanying drawings, it is apparent that the invention is not restricted to it but can be modified in many ways within the scope of the inventive idea disclosed in the attached claims. The solution described in the examples can be an ASP (Application Service Provider) application, in which case the administrator of the servers can serve several different broadcasting companies and license maintenance rights of the servers to other countries.

The invention claimed is:

1. A method for broadcasting a programme, the method comprising:
    broadcasting from a broadcasting system a programme over a broadcasting path of the broadcasting system;
    transferring from a server broadcast programme-associated data to a cellular radio network;
    transmitting from a base station of the cellular radio network the broadcast programme-associated data at a specific frequency defined for the cellular radio network in such a manner that the transmission of the broadcast programme-associated data is synchronized with the broadcasting of the programme; and
    receiving with a subscriber terminal of the cellular radio network the programme and the broadcast programme-associated data in such a manner that a programme receiver of the subscriber terminal receives from the broadcasting path of the broadcasting system the programme and a cellular radio network transceiver of the subscriber terminal receives the broadcast programme-associated data at a specific frequency,
    wherein the transmission of the broadcast programme-associated data is synchronized with the broadcasting of the programme in such a manner that the broadcast programme-associated data is transmitted to the subscriber terminal so that the subscriber terminal receives the broadcast programme-associated data, but does not use the broadcast programme-associated data until after a permission to do so has been obtained, which avoids momentary overload of a capacity of the cellular radio network by not transmitting the radio programme-associated data to all subscribers at the same time, and wherein permission to use the broadcast programme-associated data is timed in relation to a clock in the subscriber terminal.

2. A method as claimed in claim 1, wherein the method also comprises: transferring the broadcast programme-associated data from the broadcasting system to the server.

3. A method as claimed in claim 1, wherein the broadcast programme-associated data comprises at least one of the following: text, sound, stationary picture, moving picture.

4. A method as claimed in claim 1, wherein the broadcast programme-associated data comprises information defining the broadcasting time of the programme.

5. A method as claimed in claim 4, wherein the method also comprises: starting the presentation of the programme in the subscriber terminal on the basis of the information defining the broadcasting time.

6. A method as claimed in claim 4, wherein the method also comprises: storing the programme in the subscriber terminal on the basis of the information defining the broadcasting time.

7. A method as claimed in claim 1, wherein the method also comprises: maintaining in the server a list of subscriber terminals that receive the broadcast programme-associated data.

8. A method as claimed in claim 1, wherein the method also comprises: establishing from the subscriber terminal a return channel through the base station to the server.

9. A method as claimed in claim 8, wherein the method also comprises: using the return channel to order a given programme for broadcasting at a specific frequency defined for the cellular radio network.

10. A method as claimed in claim 8, wherein the method also comprises: using the return channel to transfer programme-associated feedback information from the subscriber terminal to the broadcasting system.

11. A method as claimed in claim 8, wherein the method also comprises: using the return channel also to make a purchase associated with an advertisement presented in the programme and/or broadcast programme-associated data.

12. A method as claimed in claim 8, wherein the method also comprises: using the return channel to transfer to the server data related to a game to be played in the subscriber terminal.

13. A method as claimed in claim 1, wherein the programme comprises a radio programme, the broadcast programme-associated data comprises data associated with a radio programme, the broadcasting system comprises a radio broadcasting system, the programme receiver comprises a radio receiver, and the broadcasting system broadcasting path comprises a specific frequency defined for the radio broadcasting system.

14. A method as claimed in claim 1, wherein the method also comprises.: multiplexing the radio programme and broadcast programme-associated data for broadcasting in a digital radio at a specific data channel or as subsidiary transmissions to an FM subcarrier.

15. A system for broadcasting a programme, the system comprising:

a broadcasting system configured to broadcast a programme over a broadcasting path of the broadcasting system;

a subscriber terminal of a cellular radio network that comprises a programme receiver configured to receive a programme from the broadcasting path of the broadcasting system;

a server configured to process broadcast programme-associated data, said server is configured to process synchronization information that defines the synchronization of the transmission of the broadcast programme-associated data with the broadcasting of the programme;

a cellular radio network configured to receive from the server the broadcast programme-associated data and synchronization information and which cellular radio network comprises a base station configured to transmit at a specific frequency defined for the cellular radio network the broadcast programme-associated data in such a manner that the transmission of the broadcast programme-associated data is synchronized with the broadcasting of the programme according to the synchronization information; and the subscriber terminal of the cellular radio network also comprises a cellular radio network transceiver configured to receive the broadcast programme-associated data at a specific frequency defined for the cellular radio network, wherein the transmission of the broadcast programme-associated data is synchronized with the broadcasting of the programme in such a manner that the broadcast programme-associated data is transmitted to the subscriber terminal so that the subscriber terminal receives the broadcast programme-associated data, but does not use the broadcast programme-associated data until after a permission to do so has been obtained, which avoids momentary overload of a capacity of the cellular radio network by not transmitting the radio programme-associated data to all subscribers at the same time, and wherein permission to use the broadcast programme-associated data is timed in relation to a clock in the subscriber terminal.

16. A system as claimed in claim 15, wherein the broadcasting system is configured to transfer the broadcast programme-associated data to the server, and the server is configured to receive the broadcast programme-associated data from the broadcasting system.

17. A system as claimed in claim 15, wherein the broadcast programme-associated data comprises at least one of the following: text, sound, stationary picture, moving picture.

18. A system as claimed in claim 15, wherein the broadcast programme-associated data comprises information defining the broadcasting time of the programme.

19. A system as claimed in claim 18, wherein a user interface of the subscriber terminal is configured to start presenting the programme on the basis of the information defining the broadcasting time.

20. A system as claimed in claim 18, wherein the subscriber terminal comprises a memory, and the subscriber terminal is configured to store the programme into the memory on the basis of the information defining the broadcasting time.

21. A system as claimed in claim 15, wherein the server is configured to maintain a list of subscriber terminals that receive the broadcast programme-associated data.

22. A system as claimed in claim 15, wherein the cellular radio network transceiver of the subscriber terminal is configured to establish a return channel through the base station to the server, and the base station is configured to receive the return channel.

23. A system as claimed in claim 22, wherein the subscriber terminal is configured to order by using the return channel a programme for broadcasting at a specific frequency defined for the cellular radio network, and the server is configured to receive the programme order.

24. A system as claimed in claim 22, wherein the subscriber terminal is configured to use a return channel to transfer programme-associated feedback information to the broadcasting system, and the broadcasting system is configured to receive the programme-associated feedback information from the subscriber terminal.

25. A system as claimed in claim 22, wherein the subscriber terminal is configured to use a return channel to make a purchase associated with an advertisement presented in the programme and/or broadcast programme-associated data, and the server is configured to receive the purchase information from the subscriber terminal.

26. A system as claimed in claim 22, wherein the subscriber terminal is configured to transfer to the server by using the return channel data related to a game to be played in the subscriber terminal, and the server is configured to receive the data related to the game from the subscriber terminal.

27. A system as claimed in claim 15, wherein the programme comprises a radio programme, the broadcast programme-associated data comprises data associated with a radio programme, the broadcasting system comprises a radio broadcasting system, the programme receiver comprises a radio receiver, and the broadcasting system broadcasting path comprises a specific frequency defined for the radio broadcasting system.

28. A system as claimed in claim 15, wherein the server is configured to multiplex the radio programme and broadcast programme-associated data for broadcasting in a digital radio at a specific data channel or as subsidiary transmissions to an FM subcarrier.

29. A system for broadcasting a programme, the system comprising:
a broadcasting system configured to broadcast a programme over a broadcasting path of the broadcasting system;
a server configured to process broadcast programme-associated data, said server is configured to process synchronization information that defines the synchronization of the transmission of the broadcast programme-associated data with the broadcasting of the programme; and
a cellular radio network configured to receive from the server the broadcast programme-associated data and synchronization information, said cellular radio network comprises a base station configured to transmit to the subscriber terminal of the cellular radio network at a specific frequency defined for the cellular radio network the broadcast programme-associated data in such a manner that the transmission of the broadcast programme-associated data is synchronized with the broadcast of the programme according to the synchronization information,
wherein the transmission of the broadcast programme-associated data is synchronized with the broadcasting of the programme in such a manner that the broadcast programme-associated data is transmitted to the subscriber terminal so that the subscriber terminal receives the broadcast programme-associated data, but does not use the broadcast programme-associated data until after a permission to do so has been obtained, which avoids momentary overload of a capacity of the cellular radio network by not transmitting the radio programme-associated data to all subscribers at the same time, and
wherein permission to use the broadcast programme-associated data is timed in relation to a clock in the subscriber terminal.

30. A system as claimed in claim 29, wherein the programme comprises a radio programme, the broadcast programme-associated data comprises data associated with a radio programme, the broadcasting system comprises a radio broadcasting system, and the broadcasting system broadcasting path comprises a specific frequency defined for the radio broadcasting system.

31. A subscriber terminal of a cellular radio network for receiving a programme, the subscriber terminal comprising:
a programme receiver configured to receive a programme from the broadcast path of a broadcasting system; and
a cellular radio network transceiver configured to receive broadcast programme-associated data at a specific frequency defined for the cellular radio network;
wherein the reception of the broadcast programme-associated data is synchronized with the reception of the programme in such a manner that the cellular radio network transceiver is configured to receive the broadcast programme-associated data and is further configured to receive a permission for using the broadcast programme-associated data transmitted to the subscriber terminal so that the subscriber terminal receives the broadcast programme-associated data, but does not use the broadcast programme-associated data until after said permission to do so has been obtained, which avoids momentary overload of a capacity of the cellular radio network by not transmitting the radio programme-associated data to all subscribers at the same time, and
wherein permission to use the broadcast programme-associated data is timed in relation to a clock in the subscriber terminal.

32. A subscriber terminal as claimed in claim 31, wherein the subscriber terminal also comprises a specific user application, with which the user easily manages the reception of the programme and the broadcast programme-associated data.

33. A subscriber terminal as claimed in claim 31, wherein the user application is installed into the subscriber terminal at the factory or downloaded to the subscriber terminal later by the vendor of the subscriber terminal, the cellular radio network operator or the user of the subscriber terminal.

34. A subscriber terminal as claimed in claim 31, wherein the user application is personalized with the user profile of the user in such a manner that the type of the broadcast programme-associated data that the subscriber terminal receives is specified in the user profile.

35. A subscriber terminal as claimed in claim 31, wherein the subscriber terminal is configured to download ready-made user profiles from the mobile server.

36. A subscriber terminal as claimed in claim 31, wherein for each user profile, a unique identifier is defined, by means of which it is possible to identify the user application in each subscriber terminal.

37. A subscriber terminal as claimed in claim 36, wherein when starting, the user application is configured to offer the user the option of selecting a station.

38. A subscriber terminal as claimed in claim 37, wherein the user application is configured to find out the cell identifier implemented by the base station, to transmit the identifier to the mobile .server, and to receive from the mobile server a list of stations received in the cell in question.

39. A subscriber terminal as claimed in claim 37, wherein the user application is configured to receive from the mobile server a list of audible stations in the location according to the location information of the subscriber terminal.

40. A subscriber terminal as claimed in claim 37, wherein the receiver of the subscriber terminal is configured to scan through the frequency spectrum and to transmit the scanning results or the frequencies of the receivable stations to the mobile server, and to receive on the basis of the transmitted information a list of receivable stations defined by the mobile station.

41. A subscriber terminal as claimed in claim 37, wherein the user interface of the subscriber terminal is configured to receive the name of the location entered by the user, and the user application is configured to transmit the name in question to the mobile server, and to receive the station list of the location transmitted by the mobile server.

42. A subscriber terminal as claimed in claim 31, wherein the programme comprises a radio programme, the broadcast programme-associated data comprises data associated with a radio programme, and the broadcasting system broadcasting path comprises a radio broadcasting system.

43. A computer readable medium encoded with computer programs that control a subscriber terminal of a cellular radio network, the computer readable medium comprising:
- a computer program configured to process a programme received by a programme receiver of the subscriber terminal from a broadcast path of a broadcasting system; and
- a computer program configured to process broadcast programme-associated data received by a cellular radio network transceiver of the subscriber terminal at a specific frequency defined for the cellular radio network, wherein the reception of the broadcast programme-associated data is synchronized with the reception of the programme in such a manner that the subscriber terminal receives the broadcast programme-associated data, but does not use the broadcast programme-associated data until after said permission to do so has been obtained, which avoids momentary overload of a capacity of the cellular radio network by not transmitting the radio programme-associated data to all subscribers at the same time, and wherein permission to use the broadcast programme-associated data is timed in relation to a clock in the subscriber terminal.

44. The method as claimed in claim 1, wherein permission to use the broadcast programme-associated data is obtained from the server.

45. The system as claimed in claim 15, wherein permission to use the broadcast programme-associated data is obtained from the server.

46. The system as claimed in claim 29, wherein permission to use the broadcast programme-associated data is obtained from the server.

47. The subscriber terminal as claimed in claim 31, wherein permission to use the broadcast programme-associated data is obtained from the server.

48. The computer readable medium as claimed in claim 43, wherein permission to use the broadcast programme-associated data is obtained from the server.

* * * * *